Aug. 10, 1943.  P. JAGUST  2,326,654
FILM MAGAZINE FOR MOTION PICTURE CAMERAS
Filed June 4, 1941  2 Sheets-Sheet 1
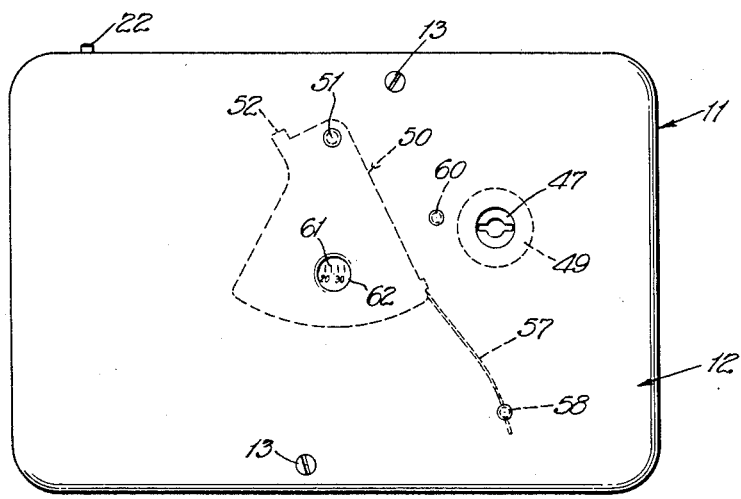
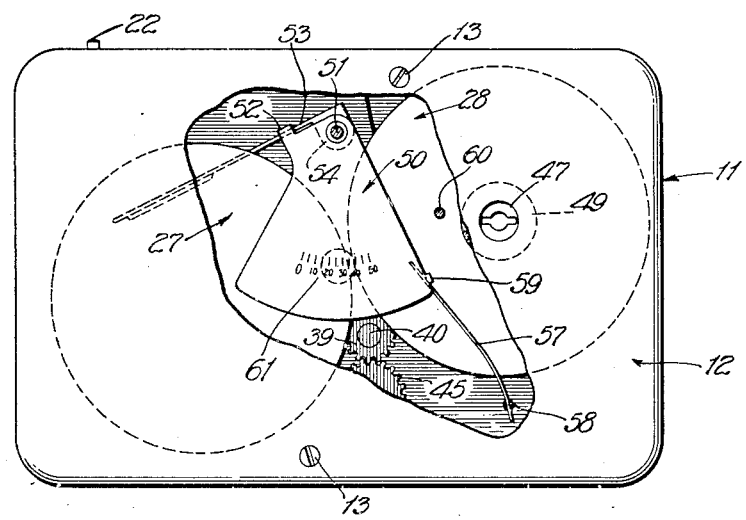
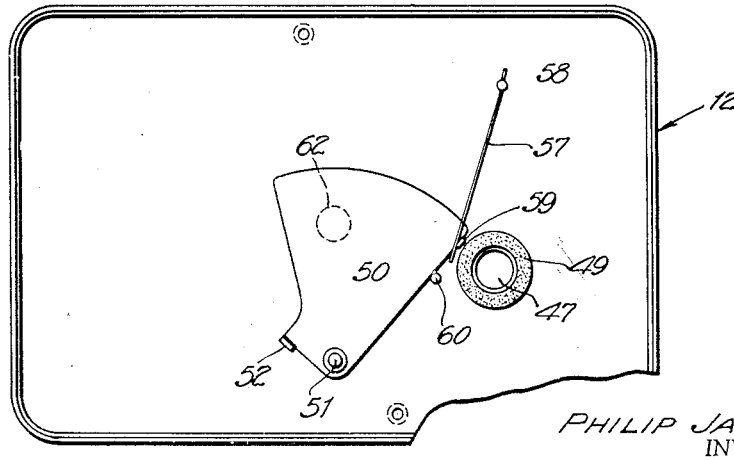
PHILIP JAGUST.
INVENTOR.
BY Ely & Pattison
ATTORNEYS.

Aug. 10, 1943.                P. JAGUST                2,326,654
                  FILM MAGAZINE FOR MOTION PICTURE CAMERAS
                     Filed June 4, 1941          2 Sheets-Sheet 2
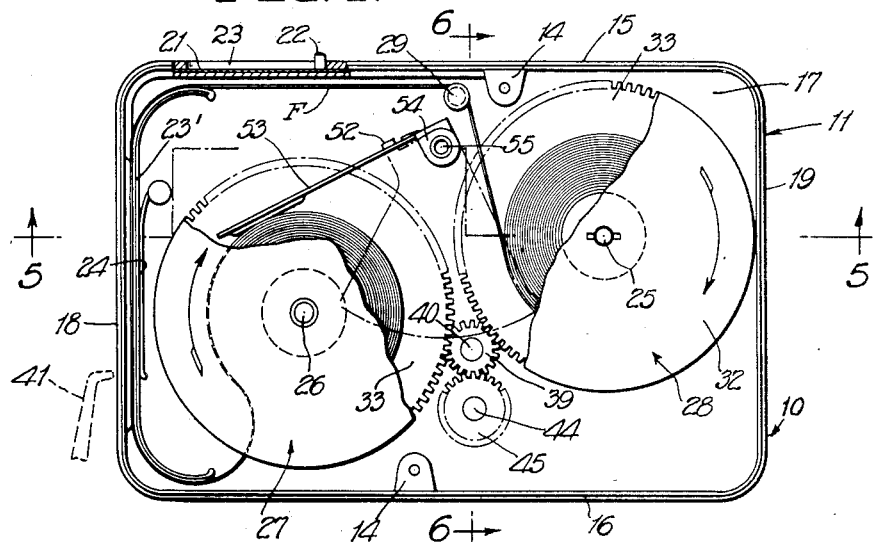
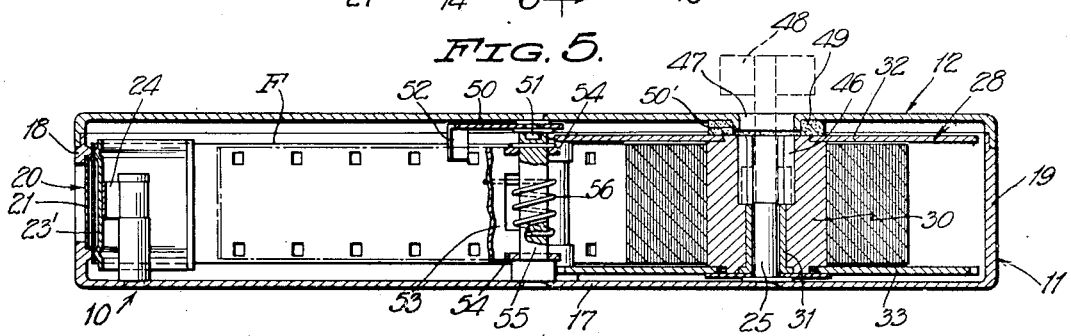
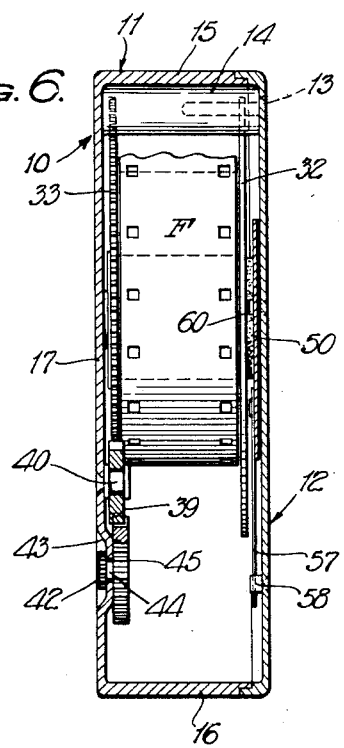
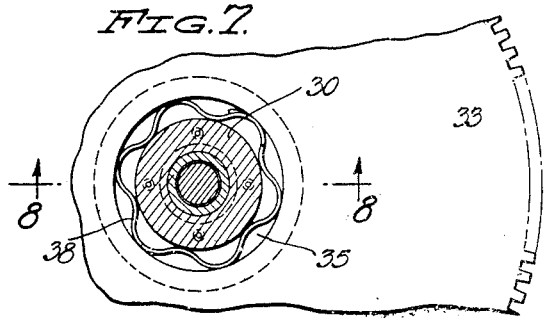
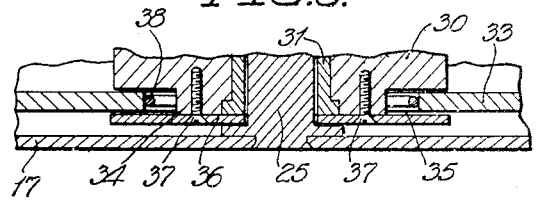
PHILIP JAGUST.
INVENTOR.
BY Ely & Pattison
ATTORNEYS.

Patented Aug. 10, 1943

2,326,654

UNITED STATES PATENT OFFICE 2,326,654

FILM MAGAZINE FOR MOTION PICTURE CAMERAS

Philip Jagust, Brooklyn, N. Y., assignor to Norman Geiger, Brooklyn, N. Y.

Application June 4, 1941, Serial No. 396,518

4 Claims. (Cl. 242—71)

This invention relates to improvements in film magazines for motion picture cameras.

One of the important features of the invention resides in a film magazine in which the tedious looping of the film within the magazine casing is eliminated in a novel manner without placing undue strain upon the film during intermittent movement thereof.

Another feature of the invention is to utilize the rotary force of the film supply roll for imparting a winding rotation to the film take-up roll.

A further feature of the invention is the provision of a film magazine which is simple and compact of construction to enable an amateur camera enthusiast to take the same apart in daylight in order to remove an exposed roll of film and to refill the same with a new supply, thus making it economically possible for the owner of a camera to purchase the film in large rolls, and winding lengths of the same onto the supply roll of the magazine, as the occasion requires.

A further feature of the invention is to provide a film magazine in which the exposed portion of the film may be manually turned backward to facilitate the subsequent re-exposure for taking of double exposures which is essential in the taking of a motion picture in which in and out fading of scenes is desired.

Other novel features of the invention will become apparent as the following specification is read in conjunction with the accompanying drawings, in which;

Figure 1 is a side elevational view of the film magazine.

Figure 2 is a view similar to Figure 1, but showing a portion of the cover broken away.

Figure 3 is an inside elevational view of the cover.

Figure 4 is a side elevational view of the film magazine with the cover removed and portions of the film rolls broken away.

Figure 5 is an enlarged horizontal sectional view on the line 5—5 of Figure 4 with the cover attached looking in the direction of the arrows.

Figure 6 is an enlarged vertical transverse sectional view on the line 6—6 of Figure 4.

Figure 7 is a greatly enlarged fragmentary vertical transverse sectional view through the spring tension means of one of the film rolls.

Figure 8 is an enlarged detail sectional view on the line 8—8 of Figure 7.

Referring to the drawings by reference characters, the numeral 10 designates the improved film magazine in its entirety which includes a rectangular casing 11 having an open side which is closed by a telescoping cover 12 removably secured in closing position by screws 13 which thread into ears or bosses 14 formed integral with the opposed top and bottom walls 15 and 16 respectively of the casing. The casing 11 also includes a vertical side wall 17, a front end wall 18, and a rear end wall 19. The front end wall 18 is provided with an exposure aperture 20 normally closed by a flexible shutter 21 operable by a pin 22 extending through a slot 23 in the top wall 15. As the magazine 10 is inserted into a camera, the pin 22 is pushed rearward from the position shown in Figures 1 and 2 to the position shown in Figure 4. A presser pad 23' is mounted rearward of the front end wall 18 for supporting the film F opposite the exposure aperture 20 and is resiliently held by a spring 24.

Fixedly mounted on the side wall 17 and extending inwardly therefrom are suitably spaced spindles 25 and 26, the latter being disposed forward of the spindle 25. The length of film F is oiginally wound on the roll 28, the outer free end of which passes over a guide post 29, from whence it extends forward and thence downward past the exposure aperture 20 and against the pressure pad 23 and is finally wound upon the core of the roll 27.

The rolls 27 and 28 are of identical construction, each including a core 30 fixed to a sleeve bearing 31 which receives the supporting spindle. Fixed to the outer end of each core 30 is an end disk 32, while resiliently connected to the inner end thereof is a gear disk 33. The inner end of the core 30 is reduced in external diameter to provide a reduced hub 34 which is surrounded by the walls of an enlarged central aperture 35 provided axially in the gear disk 33. An end plate washer 36 is secured to the inner end of the core by screws 37 and overlaps the outer face of the gear disk to confine an annular undulated tension spring 38 which bears against the hub 34 and the inner walls of the aperture 35. Thus it will be seen that the gear disk 33 of each roll is resiliently connected to its core. The gear disks of the rolls 27 and 28 are disposed close to the side wall 17 and are disposed in the same plane but at suitably spaced distances apart to be free of each other and to permit meshing of the teeth of the gear disks with a relatively small intermediate connecting gear 39 which is rotatably mounted on a spindle 40 secured to and extending from the inner side of the side wall 17.

Different makes of motion picture cameras are equipped with different means for advancing the film F past the exposure aperture, one of such means being a driven claw 41 shown in dotted lines in Figure 4 which works through an aperture adjacent the exposure aperture 20. As the claw 41 advances the film, it pulls the same from the roll 28, whereupon rotation of the roll 28 causes the gear disk 33 thereof to drive the intermediate gear 39, which in turn imparts winding clockwise rotation to the roll 27 through the gear disk 33 thereof. Another conventional means of advancing the film is by a gear 42 disposed in an inwardly offset portion 43 in the side wall 17, and which gear is fixed to the outer end of a stub shaft 44 journaled in the wall of the offset portion and which has a gear 45 in mesh with the intermediate gear 39. When the magazine is in position with a camera having driving gear which meshes with the gear 42, the shaft 44 is turned causing the gear 45 to turn the gear 39, which imparts a pay-off clockwise rotation to the gear disk 33 of the roll 28 and a simultaneous winding clockwise rotation to the gear disk 33 of the roll 27. Thus it will be understood that regardless of which type of means is used for advancing the film past the exposure aperture, a simultaneous clockwise rotation is imparted to the rolls 27 and 28. The resilient connections between the cores 30 and gear disks 33 of the rolls 27 and 28 permits turning of the cores relative to the gear disks, and vice versa, to prevent breakage of the film by excess pull thereon.

In the taking of motion pictures involving the fading in and out of scenes, it is necessary to produce a double exposure, and I have embodied in the film magazine 10, a simple and easy means for rewinding exposed films on the supply roll 28, such means including a key receiving slot 46 in the outer end of the core 30 and sleeve 31 of the roll 28. The key receiving slot 46 registers with an aperture 47 in the cover 12 through which a winding key 48 shown in dotted lines, is inserted for turning engagement with the walls of the key receiving slot. A felt, rubber, or other resilient washer 49 surrounds the aperture 47 and bears against the end disk 32 of the roll 28 and adjacent wall of the cover 12. An inwardly extending annular flange 50' is provided on the cover about the aperture 47 to secure the washer 49 in position. By withdrawing the magazine 10 partially from the camera, the key 48 may be inserted through the aperture 47 and engaged with the walls of the key slot 46, whereupon manual turning of the key in a counter-clockwise direction will cause film to be wound from the take-up roll to the supply roll for re-passage past the exposure aperture 20.

Means is also provided in the film magazine for indicating the amount of film by "foot" measurements which has been wound upon the take-up roll 27, and by which the user may refer to, in order to know the amount of film remaining on the film supply roll 28, it being understood that the original roll 28 may contain any standard length film, such as fifty or one-hundred feet. The indicating means is carried by the removable cover 12 and includes a segmental shaped indicating member 50 pivoted at its top upon a pin 51 extending from the inner side of the cover 12. One side edge of the member 50 is provided with a rearwardly extending lug 52, which when the cover 12 is in position over the open side of the casing 11, overlies a feeler arm 53 having ears 54 pivoted to a pin 55 extending outwardly from the side wall 17 and disposed in axial alinement with the pivot pin 51. The free end of the arm 52 overlies the core of the roll 27 and bears against the outer convolution of film as it is wound thereon. A spring 56 carried by the pin 55 acts to urge the arm against the core of the roll 27. The lug 52 of the indicating member is held against the upper face of the arm 53 by a spring 57 having one end connected to an anchor pin 58 and its other end bearing against a finger 59 extending from the inner side of the cover. The spring 59 tends to normally swing the indicating member 50 in the direction of a stop pin 60 extending inwardly from the cover 12, whereby the lug 52 is held against the arm 53. The front face of the member 50 is provided with an arcuate series of graduations 61 indicative of "feet" which are readable through a small round opening 62 provided in the cover 12. When the take-up roll is empty of any wound film, the zero (0) graduation shows through the opening 62 at which time the member 50 is abutting the stop pin 60, however, as the convolutions of film are wound upon the take-up roll 27 from the supply roll 28, the arm 53 swings upward thus causing the member 50 to move away from the stop pin 60 as illustrated in Figure 2 wherein the indicator reads "twenty-five" feet. If the original supply roll contains fifty feet of film F, it is obvious that twenty-five feet of film have been exposed and twenty-five feet remain on the supply roll. The reading of the indicator is obtained by sliding the film magazine partially from the camera compartment which receives it. When the entire length of film has been exposed and wound upon the take-up roll 27, the magazine 10 is removed from the camera and taken to a dark room where the cover 12 is removed from the casing 11, the roll 27 is removed, the now empty roll 28 is also removed and placed upon the spindle 27 to become the take-up roll. A new roll 28 containing an unexposed length of film is placed upon the spindle 25 and the free end threaded over the guide pin 29, thence down past the exposure aperture 20 and presser pad 23', and finally fixedly attached to the core of the take-up roll. When the cover 12 is removed, the spring 27 moves the indicating member 50 to a position against the stop pin 60 as illustrated in Figure 3. When placing an empty take-up roll 27 on the spindle 26, the operator must swing the arm 53 upwardly clear of the periphery of the end disks, after which it is released and swings down so that the free end of the arm rests upon the core 30 of said roll. As the cover 12 is replaced over the open side of the casing, the lug assumes a position over the arm 53 as best illustrated in Figures 2 and 4.

From the foregoing description it will be seen that I have provided a simple and inexpensive film magazine especially adapted for use by amateur motion picture photographers, who may reload the magazine with film after a supply has become exhausted, which is economical, in that it permits the purchasing of film in lengths in excess of the capacity of the magazine, and the cutting and winding of the film in lengths upon rolls, for use as and when the occasion requires. The construction and assembly of the parts of the magazine 10 are simple to facilitate disassembly and reassembly in daylight, and when assembled, the casing is light-proof to prevent any possible entry of light which might expose the film contained therein.

While I have shown and described what I consider to be the preferred embodiment of my invention, I wish it to be understood that such changes in construction and design as come within the scope of the appended claims may be resorted to if desired without departing from the spirit of the invention as set forth in the appended claims.

Having thus described the invention, what I claim as new and desire to secure by Letters Patent of the United States, is:

1. In a film magazine for use by amateur photographers, a rectangular lightproof casing having a side wall and a front end wall, the front end wall being provided with an exposure aperture, spaced front and rear spindles fixedly mounted on the side wall and extending inwardly therefrom, a film take-up roll rotatably mounted on the front spindle, a film supply roll rotatably mounted on the rear spindle, means within said casing for guiding the film from the supply roll past said exposure aperture and for direct winding upon the take-up roll, each roll including a core, enlarged outer and inner end disks concentric to the core, the outer end disk being fixedly secured to the outer end of said core, a resilient connection between the inner end disk and the inner end of said core, a gear provided on the inner end disk of the take-up roll, a gear provided on the inner end disk of the supply roll, an intermediate gear mounted on the inner side of the side wall and in gear meshing engagement with the gear of the take-up roll and the gear on the supply roll, and a drive gear rotatably mounted on the inner side of the said side wall and being in meshing engagement with said intermediate gear.

2. In a film magazine for use by amateur photographers, a rectangular lightproof casing having a side wall and a front end wall, the front end wall being provided with an exposure aperture, spaced front and rear spindles fixedly mounted on the side wall and extending inwardly therefrom, a film take-up roll rotatably mounted on the front spindle, a film supply roll rotatably mounted on the rear spindle, means within said casing for guiding the film from the supply roll past the exposure aperture and for direct winding upon the take-up roll, each roll including a core, an enlarged disk fixedly secured to the outer end of said core, an enlarged disk resiliently connected to the inner end of said core, the said disks being concentric to the axis of said core and adapted to conceal the convolutions of film wound upon the core, an intermediate gear mounted on the side wall and disposed between the resiliently mounted disks of the supply roll and the take-up roll, gear means on the resiliently mounted disks in meshing engagement with the intermediate gear, and a drive gear rotatably mounted on the inner side of said side wall in driving engagement with said idler gear, whereby rotation of the drive gear will impart a winding movement to the take-up roll and an unwinding movement to the supply roll.

3. In a film magazine, the combination with a casing open at one side and having a side wall, a film supply roll rotatably supported by said side wall, a film take-up roll rotatably supported by said side wall, said supply roll and said take-up roll each having a core, an outer end disk fixed to the outer end of said core, an inner end disk provided with peripheral gear teeth, resilient means connecting the inner end disk to the inner end of said core, and an intermediate gear rotatably mounted on said side wall in constant mesh with the gear teeth on the inner end disks of the film supply roll and the film take-up roll, whereby both rolls rotate simultaneously in the same direction.

4. In a film magazine as set forth in claim 3, including a key receiving recess provided in the outer end of the core of the supply roll, a cover closing the open side of said casing having a key opening therein in alinement with the key receiving recess to enable the insertion of a key through said key opening and into the key receiving recess.

PHILIP JAGUST.